US012630572B2

(12) United States Patent
Jeong et al.

(10) Patent No.: US 12,630,572 B2
(45) Date of Patent: May 19, 2026

(54) METHOD FOR PREPARING SULFONATED ARYLPHOSPHINE

(71) Applicant: HANWHA SOLUTIONS CORPORATION, Seoul (KR)

(72) Inventors: Gyeongseon Jeong, Daejeon (KR); Shinbeom Lee, Daejeon (KR); Junhee Han, Daejeon (KR); Keedo Han, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 488 days.

(21) Appl. No.: 18/247,379

(22) PCT Filed: Oct. 27, 2021

(86) PCT No.: PCT/KR2021/015257
§ 371 (c)(1),
(2) Date: Mar. 30, 2023

(87) PCT Pub. No.: WO2022/092825
PCT Pub. Date: May 5, 2022

(65) Prior Publication Data
US 2023/0416285 A1 Dec. 28, 2023

(30) Foreign Application Priority Data
Oct. 28, 2020 (KR) ........................ 10-2020-0141114

(51) Int. Cl.
*C07F 9/50* (2006.01)
*B01D 3/34* (2006.01)
*B01D 11/04* (2006.01)

(52) U.S. Cl.
CPC ............ *C07F 9/5022* (2013.01); *B01D 3/346* (2013.01); *B01D 11/0488* (2013.01); *B01D 11/0492* (2013.01); *C07F 9/5054* (2013.01); *C07F 9/5095* (2013.01)

(58) Field of Classification Search
None
See application file for complete search history.

(56) References Cited

U.S. PATENT DOCUMENTS 5,684,181 A 11/1997 Albanese
6,864,387 B2 * 3/2005 Riedel .................. B01J 31/2404
562/35

FOREIGN PATENT DOCUMENTS

| CN | 1073665 A | 6/1993 |
| CN | 1132208 A | 10/1996 |
| CN | 1352648 A | 6/2002 |
| EP | 1173450 A1 | 1/2002 |
| KR | 10-1993-0012594 A | 7/1993 |
| KR | 10-1996-0010668 A | 4/1996 |
| KR | 10-2001-0108520 A | 12/2001 |
| KR | 10-0353331 B1 | 1/2003 |

(Continued)

OTHER PUBLICATIONS

International Search Report Dated May 5, 2022.

*Primary Examiner* — Medhanit W Bahta
(74) *Attorney, Agent, or Firm* — Harvest IP Law, LLP

(57) ABSTRACT

Provided is a method of preparing sulfonated aryl phosphine, the method capable of preparing sulfonated aryl phosphine with high purity and high yield by efficiently removing sulfur trioxide generated during preparing sulfonated aryl phosphine using an extractant.

12 Claims, 7 Drawing Sheets

(56) References Cited

FOREIGN PATENT DOCUMENTS

| WO | 00-39134 | A1 | 6/2000 |
| WO | 0064913 | A1 | 11/2000 |

* cited by examiner

【FIG. 1】
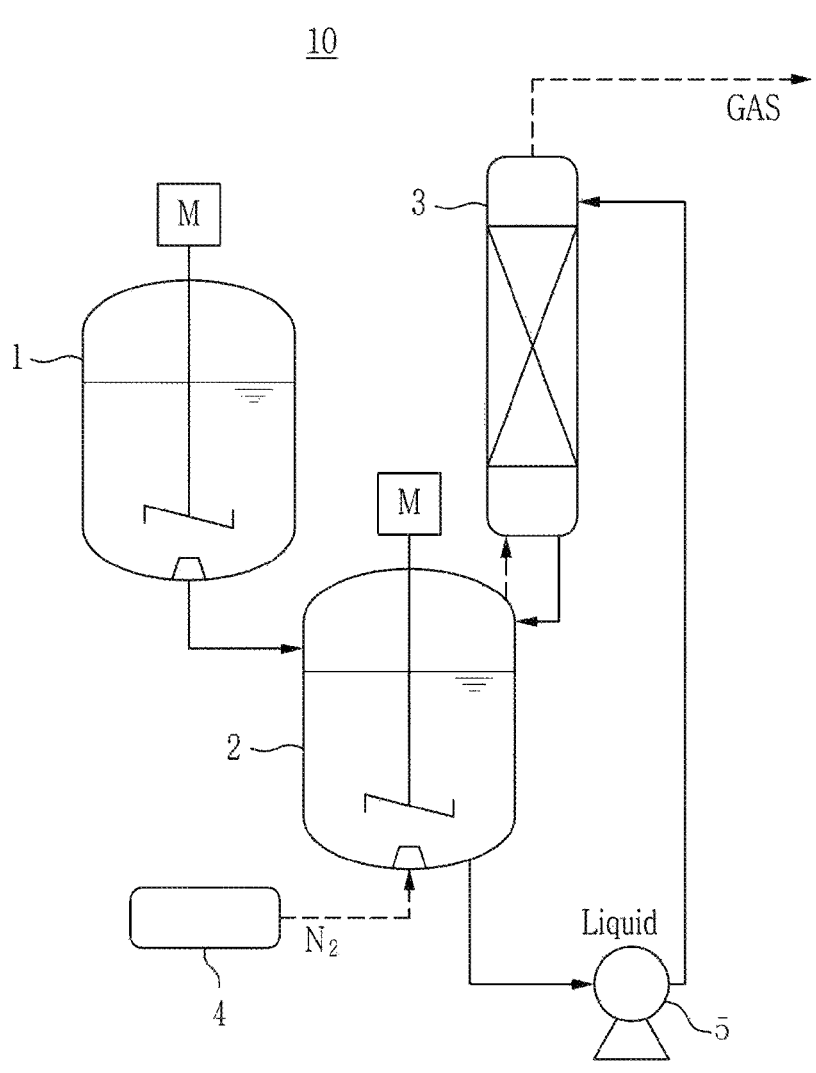

【FIG. 2】
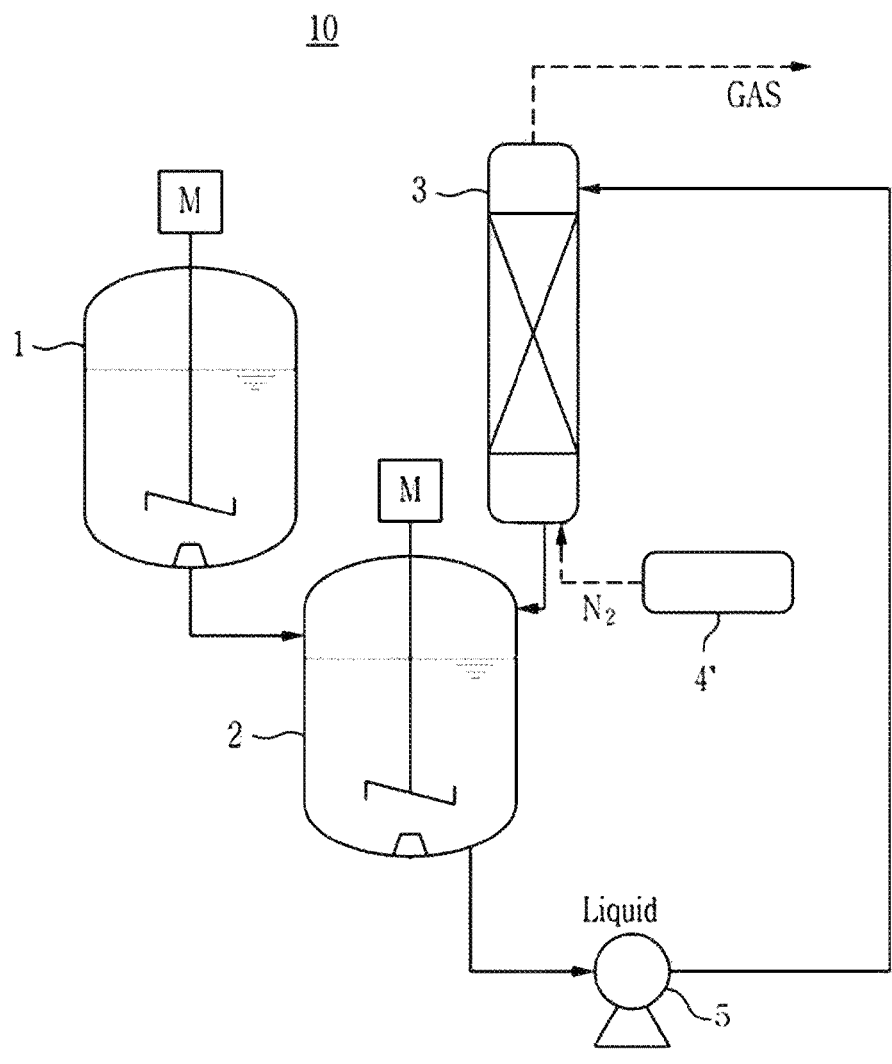

【FIG. 3】
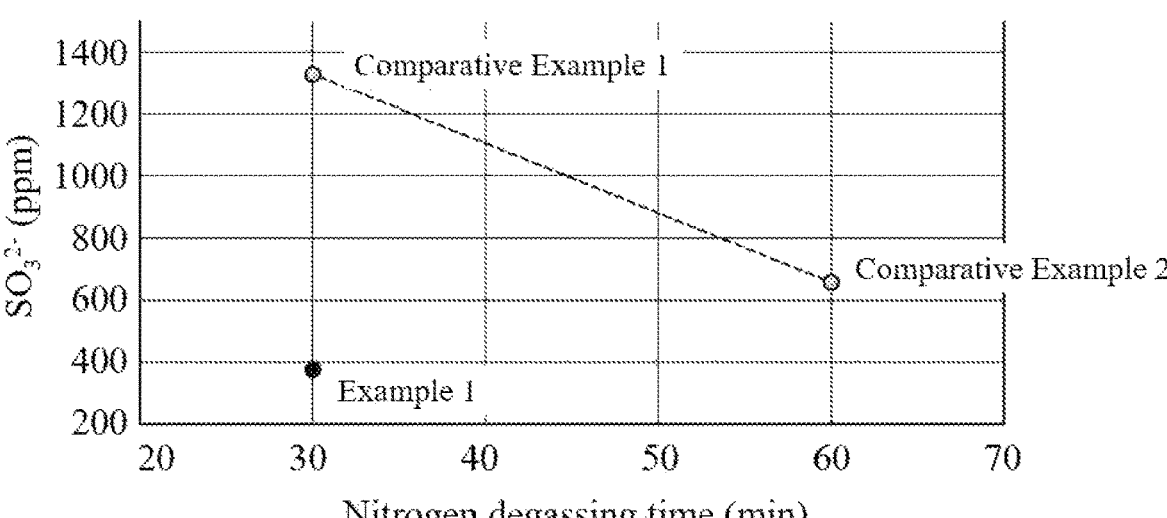

【FIG. 4】
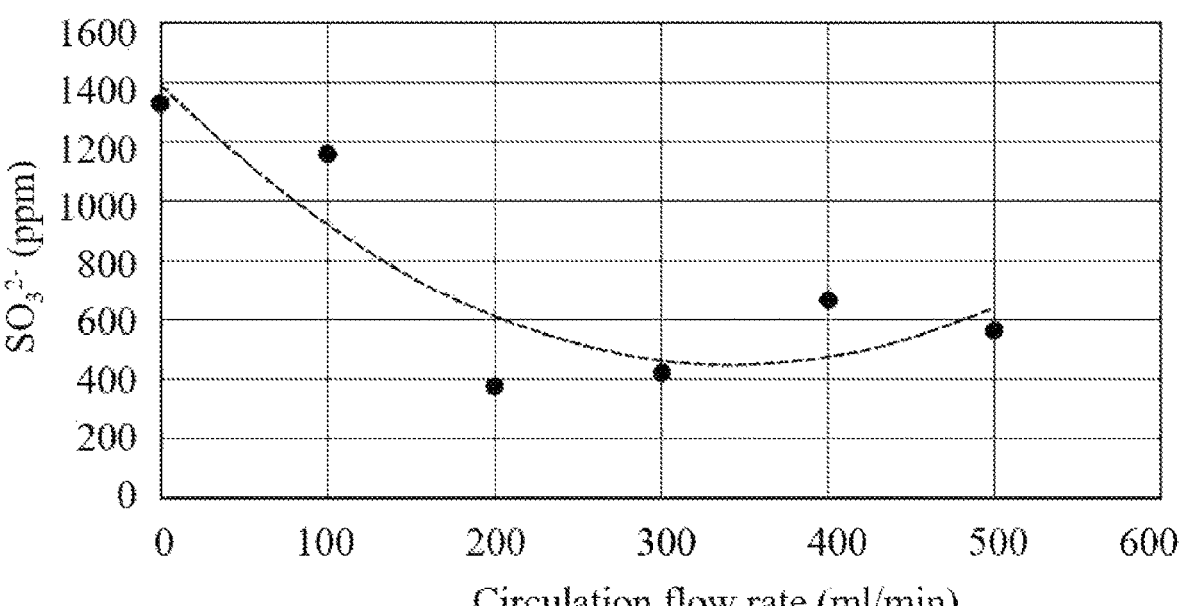

【FIG. 5】
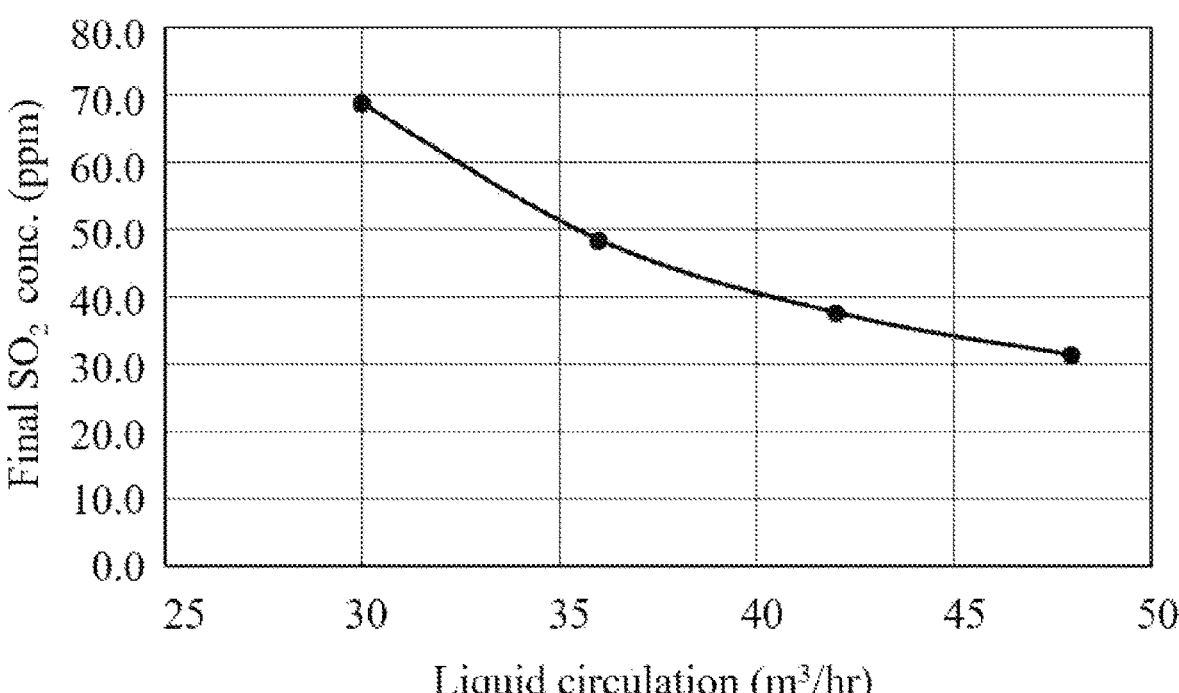

【FIG. 6】
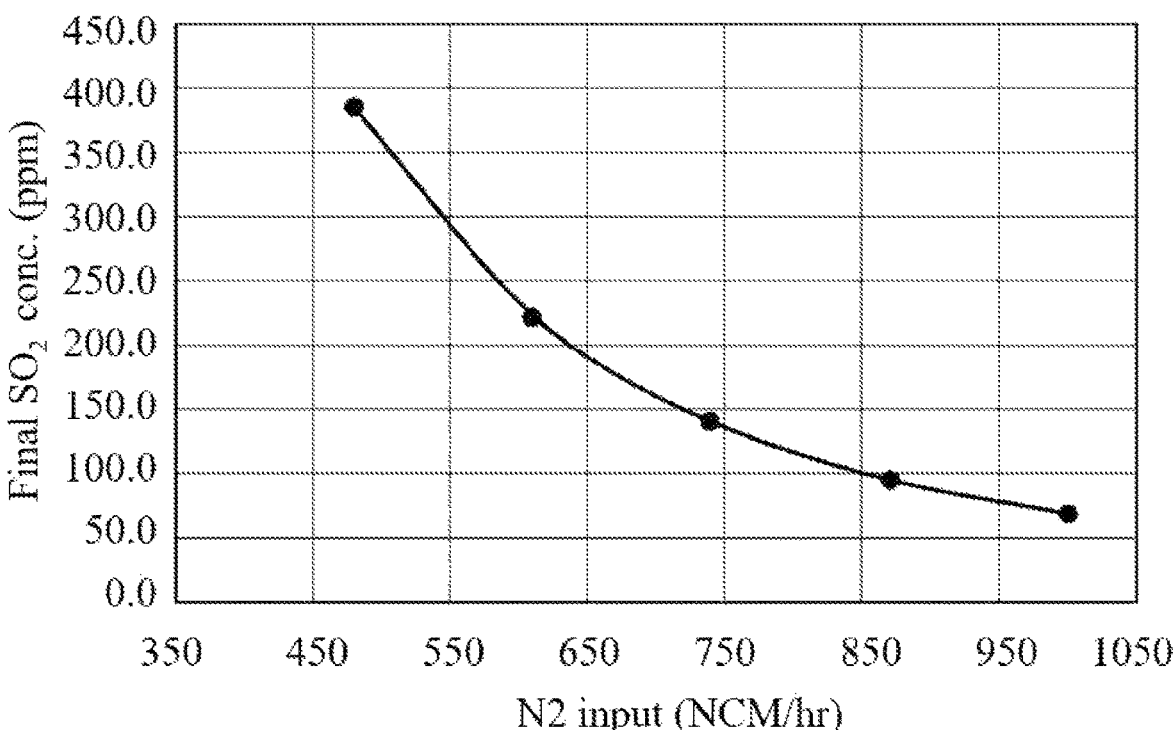

【FIG. 7】
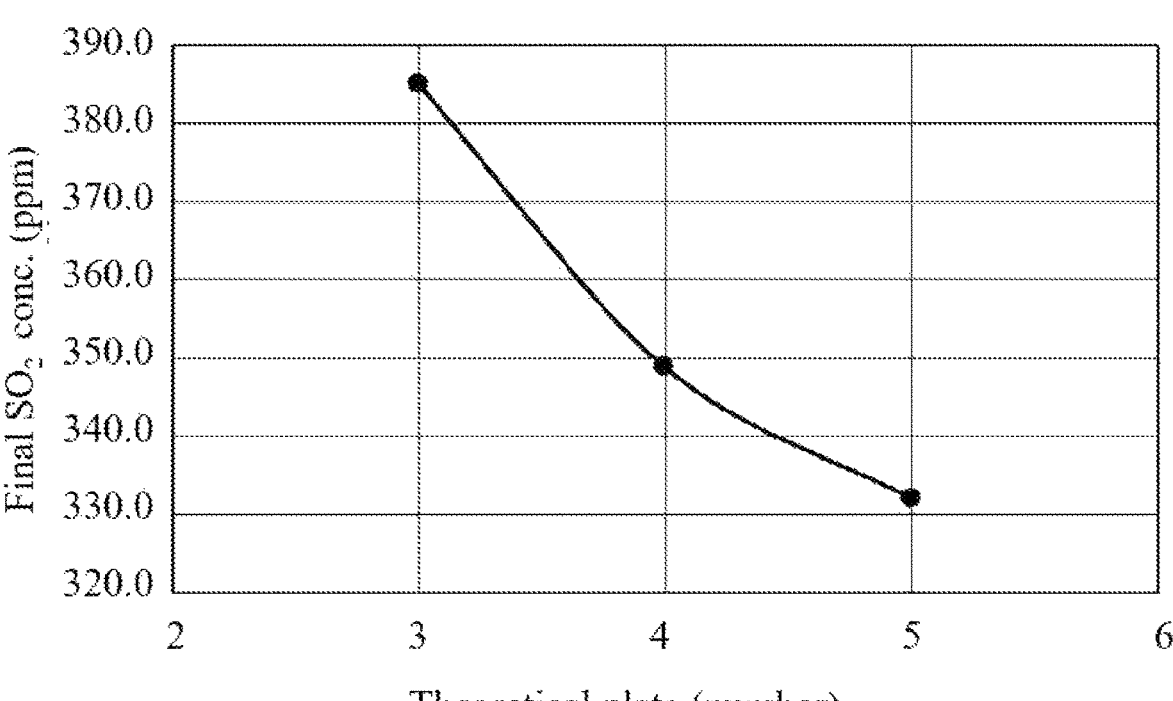

METHOD FOR PREPARING SULFONATED ARYLPHOSPHINE

CROSS-REFERENCE TO RELATED APPLICATION(S)

The application is a National Stage of International Application No PCT/KR2021/015257 filed on Oct. 27, 2021 claiming priority based on Korean Patent Application No. 10-2020-0141114, filed on Oct. 28, 2020, the disclosure of which is hereby incorporated by reference herein in its entirety.

TECHNICAL FIELD

The present invention relates to a method of preparing sulfonated aryl phosphine.

BACKGROUND ART

A method of preparing aldehyde using a hydroformylation method is generally performed by reacting olefins with carbon monoxide and hydrogen. In this regard, as a catalyst, a complex containing cobalt or rhodium as a central metal atom and triphenylphosphine, specifically, tris(m-sulfophenylphosphine) (TPPTS) ligand as a ligand is used in an aqueous solution state of being dissolved in water. As described, when the catalyst is used in the aqueous solution state, there are advantages that the catalyst may be easily separated and recovered from water-soluble or insoluble reaction products and is recyclable, and thus studies have been continuously performed on the development and preparation of complex catalysts.

Sulfonated aryl phosphine, represented by sulfonated phenyl phosphine, is usually prepared by reacting fuming sulfuric acid (concentrated sulfuric acid or oleum) with aryl phosphine, diluting with water, and extracting the diluted sulfonated mixture with a water-insoluble amine solution in a water-insoluble organic solvent, and then neutralizing with a base solution such as sodium hydroxide, etc.

However, at this time, sulfites such as sodium sulfite are generated, in addition to the desired sulfonated aryl phosphine, and exist in the form of sulfur trioxide in which sulfur dioxide is dissolved in the reaction solution. These sulfur compounds remain as impurities in the sulfonated aryl phosphine solution without being removed even by posttreatment of the reaction mixture with an aqueous sodium hydroxide solution. As a result, they not only act as pollutants during the hydroformylation reaction using sulfonated aryl phosphine, but also interfere with various chemical reactions to form undesirable mixed aldol or trimerization products from aldehydes, and furthermore, are involved in the poisoning of hydrogenation catalysts during hydrogenation of aldehydes to obtain alcohols. In addition, sulfur trioxide present in the reaction solution oxidizes trivalent phosphorus into pentavalent phosphorus to form a phosphorus-oxygen compound.

Accordingly, various methods have been studied to remove sulfur compounds generated during the production of sulfonated aryl phosphine. For example, a method of removing sulfur trioxide present in the reaction solution using boric acid has been suggested. However, at this time, a significant amount of boron compound is formed, and there is a problem in that it must be removed from the reaction product.

Accordingly, it is necessary to develop a method of easily preparing sulfonated aryl phosphine without sulfur compounds such as sodium sulfite, etc.

DETAILED DESCRIPTION OF THE INVENTION

Technical Problem

Accordingly, there is provided a method of preparing sulfonated aryl phosphine, the method capable of preparing sulfonated aryl phosphine with high yield by removing sulfur trioxide present in an extraction solution during preparing sulfonated aryl phosphine using an extractant.

There is also provided a device for preparing sulfonated aryl phosphine, the device useful for the above preparation method.

Technical Solution

To achieve the above objects, according to the present invention, there is provided a method of preparing sulfonated aryl phosphine, the method including the steps of performing sulfonation of aryl phosphine to obtain a reaction product including sulfonated aryl phosphine; performing a first extraction by adding a water-insoluble amine-based extractant into the reaction product including sulfonated aryl phosphine to obtain an organic phase including sulfonated aryl phosphine; bringing the organic phase into contact with an inert gas by stripping to remove sulfur trioxide in the organic phase; and performing a secondary extraction by adding a base extractant to the organic phase from which sulfur trioxide has been removed as a result of the above step.

According to the present invention, there is also provided a device for preparing sulfonated aryl phosphine, the device including a sulfonation reactor in which sulfonation of aryl phosphine is performed; an extraction reactor which is placed by being connected with the sulfonation reactor and a stripper, and performs a first extraction of the reaction product including sulfonated aryl phosphine introduced from the sulfonation reactor and a secondary extraction of an organic phase from which sulfur trioxide has been removed by stripping in the stripper; an inert gas supply unit that supplies inert gas into the stripper; and the stripper which is placed by being connected with the extraction reactor and the inert gas supply unit, and performs stripping of the organic phase including sulfonated aryl phosphine resulting from the first extraction, which is introduced from the extraction reactor, by inert gas introduced from the inert gas supply unit, thereby removing sulfur trioxide in the organic phase.

Advantageous Effects

According to the present invention, sulfonated aryl phosphine may be obtained with high yield by efficiently removing sulfur trioxide during the preparation of sulfonated aryl phosphine, and side reactions caused by sulfur trioxide may be suppressed in a process of using the same.

BRIEF DESCRIPTION OF THE DRAWINGS

FIG. 1 shows a schematic illustration of a device for preparing sulfonated aryl phosphine according to one embodiment of the present invention;

FIG. 2 shows a schematic illustration of a device for preparing sulfonated aryl phosphine according to another embodiment of the present invention;

FIG. 3 shows a graph showing the results of comparing the effects of reducing the $SO_3^{2-}$ concentration in a sulfonated phenyl phosphine-containing aqueous solution finally prepared, when sulfonated phenyl phosphine is prepared according to Examples, Comparative Example 1, and Comparative Example 2, in Experimental Example 1;

FIG. 4 shows a graph showing the results of evaluating the effects of a liquid circulation flow rate on the effect of removing $SO_3$ in sulfonated aryl phosphine in Experimental Example 2 (fixed at $N_2$ input rate of 5 L/min, five theoretical plates, nitrogen degassing time of 30 minutes, and nitrogen degassing temperature of 20° C.);

FIG. 5 shows a graph showing the results of observing changes in the concentration of $SO_2$ remaining in the sulfonated phenyl phosphine-containing aqueous solution finally prepared by varying only the liquid circulation flow rate in Experimental Example 3 (fixed at $N_2$ input rate of 1000 NCM/hr, three theoretical plates, nitrogen degassing time of 2 hours, and nitrogen degassing temperature of 20° C.);

FIG. 6 shows a graph showing the results of evaluating the effects of inert gas input on the effect of removing $SO_3$ in sulfonated aryl phosphine in Experimental Example 4 (fixed at liquid circulation rate of 30 m³/hr, three theoretical plates, nitrogen degassing time of 2 hours, and nitrogen degassing temperature of 20° C.); and FIG. 7 shows a graph showing the results of evaluating the effects of changes in the number of theoretical plates of packing in a stripper on the effect of removing $SO_3$ in sulfonated aryl phosphine in Experimental Example 5 (fixed at $N_2$ input rate of 480 NCM/hr, liquid circulation rate of 30 m³/hr, nitrogen degassing time of 2 hours, and nitrogen degassing temperature of 20° C.).

DETAILED DESCRIPTION OF THE EMBODIMENTS

Hereinafter, exemplary embodiments of the present invention will be described in detail with reference to the accompanying drawings so that the present invention can be easily put into practice by those skilled in the art. The present invention may be embodied in various forms, but is not limited to the exemplary embodiments explained herein.

In order to clearly describe the present invention, parts irrelevant to the description are omitted, and like reference numerals designate like or similar elements throughout the specification.

Throughout the present specification, when a part is referred to as being "connected" to another part, it includes not only the case of "being directly connected," but also the case of "being indirectly connected" having another element therebetween. Further, when a part is referred to as "including" another component, it means the part may further include other components, rather than excluding other components, unless specifically stated otherwise.

Hereinafter, embodiments of the present invention will be described in detail with reference to drawings.

A method of preparing sulfonated aryl phosphine according to the present invention includes the steps of:

performing sulfonation of aryl phosphine to obtain a reaction product including sulfonated aryl phosphine (step 1);

performing a first extraction by adding a water-insoluble amine-based extractant into the reaction product including sulfonated aryl phosphine to obtain an organic phase including sulfonated aryl phosphine (step 2);

bringing the organic phase into contact with an inert gas by stripping to remove sulfur trioxide in the organic phase (step 3); and performing a secondary extraction by adding a base extractant to the organic phase from which sulfur trioxide has been removed as a result of the above step (step 4).

Hereafter, each step will be described in detail.

The step 1 is a step of performing sulfonation of aryl phosphine.

Specifically, the step 1 may be performed by sulfonating aryl phosphine by reacting with a sulfonating agent.

The aryl phosphine may be monophosphine, diphosphine, oligophosphine or polyphosphine containing one or more aromatic radicals.

The aromatic radical may include a single aromatic ring structure such as phenyl; two or more aromatic ring structures bound to each other by a single C—C bond, such as biphenyl; and fused ring structures such as naphthyl, indenyl, etc. In addition, the aromatic radical may be substituted with one or more substituents such as halogen, $C_{1-10}$ alkyl, $C_{1-10}$ alkoxy, or nitro.

Specifically, the monophosphine may include dimethylphenylphosphine, methyldiphenylphosphine, or triphenylphosphine, etc., and any one thereof or a mixture of two or more thereof may be used. Examples of the diphosphine may include 2,2'-bis(diphenylphosphinomethyl)biphenyl, or 2,2'-bis(diphenylphosphinomethyl)binaphthyl, etc., and any one thereof or a mixture of two or more thereof may be used. In addition, trivalent phosphorus compounds in which the phosphorus atom is part of the ring structure may be used, such as phosphabenzene, aryl, and/or alkyl-substituted phosphole, etc.

The sulfonation of the aryl phosphine may be performed by reaction with a sulfonating agent such as fuming sulfuric acid.

As the concentration of $SO_3$ in the sulfonating agent is higher, the temperature is higher during the sulfonation reaction, and the reaction time is longer, the degree of sulfonation of arylphosphine increases. Accordingly, it is preferable to properly determine the input amount of the sulfonating agent, reaction temperature and time according to the desired degree of sulfonation.

Specifically, the sulfonating agent may be introduced into a solution having a $SO_3$ concentration of 20% by weight to 65% by weight. When added in the above concentration range, sulfonation may be achieved with excellent efficiency. More specifically, the sulfonating agent may be introduced into a solution having a $SO_3$ concentration of 20% by weight or more, or 25% by weight or more, and 65% by weight or less, or 50% by weight or less, or 40% by weight or less, or 30% by weight or less.

In addition, the sulfonation reaction may be carried out in the temperature range of 0° C. to 80° C., more specifically, 0° C. or higher, or 10° C. or higher, or 20° C. or higher, and 80° C. or lower, or 50° C. or lower, or 40° C. or lower.

After completion of the sulfonation reaction, sulfonated aryl phosphine is obtained in the form of an aqueous acid solution, and side reaction products may be included in reaction products.

On the other hand, in order to lower the content of sulfuric acid in the aqueous acid solution to a predetermined level, dilution may be performed by adding water. Specifically, the dilution may be performed by adding water until the concentration of sulfuric acid in the reaction product becomes 25% by weight to 35% by weight.

In addition, it is preferable to prevent the reaction product from overheating during the dilution, specifically, the dilution is preferably performed while maintaining a temperature of 0° C. to 40° C., more specifically 0° C. to 20° C.

Next, the step 2 is a step of performing a first extraction by adding a water-insoluble amine-based extractant into the reaction product including sulfonated aryl phosphine prepared in the step 1.

As the water-insoluble amine-based extractant used in the first extraction step, specifically, $C_{10-60}$, or $C_{20-40}$, or $C_{20-30}$ secondary aliphatic amines including straight or branched-chain alkyl; $C_{10-60}$, or $C_{20-40}$, or $C_{20-30}$ tertiary aliphatic amines, including straight or branched chain alkyl; or $C_{6-60}$, or $C_{12-40}$, or $C_{18-30}$ aromatic amines, etc. may be used. Specific examples may include isotridecylamine, tri-n-octylamine, triisooctylamine, triisononylamine, tri-n-decylamine, tribenzylamine, etc., and any one thereof or a mixture of two or more thereof may be used.

The water-insoluble amine-based extractant may be added at a molar ratio of 0.7 to 1.5, based on 1 mole of $SO_3$ in the reaction product. When the input amount is less than a molar ratio of 0.7, sufficient extraction is difficult, and when the input amount is more than a molar ratio of 1.5, loss of phosphine may occur, and separation and purification become difficult. More specifically, the water-insoluble amine-based extractant may be added at a molar ratio of 0.7 or more, or at a molar ratio of 1 or more, or at a molar ratio of 1.2 or more, at a molar ratio of 1.5 or less, or at a molar ratio of 1.4 or less, or at a molar ratio of 1.35, based on 1 mole of $SO_3$ in the reaction product.

In addition, the water-insoluble amine-based extractant may be introduced in a solution phase of being dissolved in an organic solvent, wherein the organic solvent includes aromatic hydrocarbon-based solvents such as toluene, benzene, etc.; and $C_{4-20}$ aliphatic alcohol solvents such as octanol, etc., or $C_{8-20}$ ether solvents such as diisopropyl ether, etc., and any one thereof or a mixture of two or more thereof may be used.

At this time, the concentration of the water-insoluble amine-based extract in the organic solvent is 1% by weight to 35% by weight, more specifically, 1% by weight or more, or 10% by weight or more, or 15% by weight or more, and 35% by weight or less, or 30% by weight or less, or 28% by weight or less.

In addition, the extraction process may be carried out in a batch or continuous manner, and a common extraction device such as a countercurrent extractor, etc. may be used.

When the water-insoluble amine-based extractant is added to the reaction product obtained in the step 1, the reaction product is separated into an organic phase and an aqueous phase. The sulfonated aryl phosphine produced in the step 1 is included in the form of an amine salt in the organic phase, and impurities such as sulfur trioxide, etc. are also included in the organic phase. On the other hand, the aqueous phase includes sulfuric acid, sodium sulfate, etc., which are then removed through separation and discharge of the aqueous phase.

Next, the step 3 is a step of removing sulfur trioxide in the organic phase obtained in the step 2.

Specifically, the step 3 may be performed by bringing the organic phase into contact with an inert gas by stripping, and as a result, sulfur trioxide ($SO_3$) contained in the organic phase is converted to gaseous sulfur dioxide ($SO_2$), which is then removed.

The inert gas may be nitrogen, helium, argon, neon, xenon, krypton, carbon dioxide, carbon monoxide, or hydrogen, etc., and among them, nitrogen may be preferable in terms of sulfur trioxide removal efficiency.

The inert gas may be directly introduced into the stripper, or may be introduced into the stripper in the degassing process after stream for the organic phase obtained in the step 2. Accordingly, the preparation method according to one embodiment of the present invention may further include the step of streaming the inert gas into the organic phase during the first extraction step, before the step of removing sulfur trioxide. In this case, the inert gas stream first passes through the organic phase obtained in the step 2, and sulfur trioxide included in the organic phase is absorbed to sulfur dioxide, and then is introduced to the bottom portion of the stripper, and sulfur trioxide remaining in the organic phase may be additionally absorbed and removed through a current flow contact with the organic phase.

In addition, when the stream process using an inert gas is further performed as described above, a process of absorbing and removing sulfur dioxide included in the inert gas may be selectively included, before being introduced into the stripper, in order to increase the sulfur trioxide removal efficiency during stripping after the stream.

Specifically, the content of sulfur dioxide in the inert gas is lowered by allowing sulfur dioxide to pass through a washing solution capable of absorbing sulfur dioxide contained in the inert gas, and then introduced into the stripper. In this case, due to the lowered content of sulfur dioxide, it is possible to remove sulfur trioxide with better efficiency than current flow contact.

As the washing solution, sodium carbonate, sodium hydroxide or sulfuric acid, etc. may be used.

Meanwhile, the stripping may be performed by current flow contact using a stripper. Specifically, the stripping may be performed by co-current flow contact or countercurrent flow contact. Among them, the stripping may be performed by counter-current flow contact, in which the contact occurs by introducing the organic phase into the top portion of the stripper and discharging the same from the bottom portion, and introducing the inert gas into the bottom portion of the stripper and discharging the same from the top portion.

The stripper used in the stripping may include a trayed column or a packing column, and among them, the packing column may be used, whereby surface area, flow area and pressure drop are easily controlled, and the contact area between the liquid phase and the gas phase may be more increased.

The packing column may include various types of packing, and specifically, may include Pall ring, Intalox saddles, Bia³ecki rings, alumina ball, etc.

On the other hand, during the current flow contact using the stripper, the sulfur trioxide removal efficiency may be further improved by controlling and optimizing the liquid circulation flow rate, the input amount of inert gas, and the number of plates in the packing.

Specifically, during the current flow contact, the liquid circulation flow rate may be 30 m³/hr to 48 m³/hr, based on the input amount of the inert gas of 1000 NCM/hr. Since the $SO_3$ removal effect decreases as the liquid circulation flow rate increases, it is preferably 48 m³/hr or less, and preferably 30 m³/hr or more in terms of considering processability and $SO_3$ removal efficiency. More specifically, the liquid circulation flow rate may be 30 m³/hr or more, or 35 m³/hr or more, or 36 m³/hr or more, or 40 m³/hr or more, or 42 m³/hr or more, or 45 m³/hr or more, and 48 m³/hr or less, based on the input amount of the inert gas of 1000 NCM/hr.

Specifically, during the current flow contact, the inert gas may be introduced in an amount of 480 NCM/hr to 1000 NCM/hr (when converted, $8.59\times10^6$ ml/min to $1.78\times10^7$ ml/min), based on the liquid circulation flow rate of 30 m³/hr. Since the SO₃ removal effect decreases as the input amount of inert gas decreases, the input amount of inert gas is preferably 480 NCM/hr or more, and preferably 1000 NCM/hr or less in terms of considering processability and SO₃ removal efficiency. More specifically, the inert gas may be introduced in an amount of 480 NCM/hr or more, or 600 NCM/hr or more, or 650 NCM/hr or more, or 700 NCM/hr or more, or 800 NCM/hr or more, or 850 NCM/hr or more, or 870 NCM/hr or more, and 1000 NCM/hr or less, or 950 NCM/hr or less, based on the liquid circulation flow rate of 30 m³/hr.

Meanwhile, the inert gas input unit NCM/hr is a unit of volume flow at 0° C. and 1 atm, which means Normal Cubic Meter per Hour, and may be expressed as Nm³/hr.

In addition, when a packing column is used during the current flow contact, the number of theoretical plates in the packing may be 3 to 5, more specifically, 3 or more, or 4 or more, and 5 or less. When the number of theoretical plates is 3, it is possible to realize the final SO₂ concentration of 350 ppm or less under low flooding conditions.

Next, the step 4 is a step of performing a secondary extraction on the organic phase, from which sulfur trioxide has been removed in the step 3, using a base extractant.

Specifically, the base extractant used in the secondary extraction process may include alkali metal hydroxide, alkaline earth metal hydroxide, ammonia, or alkali metal carbonate, and among them, any one thereof or a mixture of two or more thereof may be used. More specifically, alkali metal hydroxide such as sodium hydroxide may be used.

However, since the base extractant may contaminate the final product when remaining, it is preferably used in the same amount as the water-insoluble amine-based extractant used in the first extraction process. Alternatively, the base extractant may be used so that the pH of the organic phase from which the sulfur trioxide has been removed is 6 to 7.

In addition, the base may be introduced in an aqueous solution phase, and at this time, the concentration may be 20% by weight to 60% by weight.

The secondary extraction process may be performed in a batch or continuous manner, and a common extraction device such as a countercurrent extractor may be used.

When the base extractant is introduced into the organic phase from which sulfur trioxide has been removed in the step 3, sulfonated aryl phosphine, which exists in the form of an amine salt in the organic phase, is converted to an aqueous phase, and obtained in the state where it is dissolved in the aqueous solution. At the same time, the water-insoluble amine-based extractant introduced in the first extraction process may be recovered.

Accordingly, the sulfonated aryl phosphine prepared by the method of preparing sulfonated aryl phosphine according to an embodiment of the present invention may be obtained in an aqueous solution state, or obtained in a solid form through subsequent processes such as evaporation, crystallization, separation or filtration, etc.

According to another embodiment of the present invention, provided is a device useful for preparing the sulfonated aryl phosphine.

Specifically, the device for preparing sulfonated aryl phosphine includes a sulfonation reactor in which sulfonation of aryl phosphine is performed; an extraction reactor which is placed by being connected with the sulfonation reactor and a stripper, and performs the first extraction of the reaction product including sulfonated aryl phosphine introduced from the sulfonation reactor and the secondary extraction of the organic phase from which sulfur trioxide has been removed by stripping in the stripper; an inert gas supply unit that supplies inert gas into the stripper; and the stripper which is placed by being connected with the extraction reactor and the inert gas supply unit, and performs stripping the organic phase including sulfonated aryl phosphine resulting from the first extraction, which is introduced from the extraction reactor, by stripping using inert gas introduced from the inert gas supply unit, thereby removing sulfur trioxide in the organic phase. Further, the device for preparing sulfonated aryl phosphine may optionally further include a pump which is placed by being connected to a bottom portion of the extraction reactor and a top portion of the stripper, and injects the organic phase discharged from the bottom portion of the extraction reactor into the stripper.

FIG. 1 shows a schematic illustration of the device for preparing sulfonated aryl phosphine according to one embodiment of the present invention.

Referring to FIG. 1, a device 10 for preparing sulfonated aryl phosphine includes a sulfonation reactor 1, an extraction reactor 2, a stripper 3, an inert gas supply unit 4, and optionally, a pump 5. Further, the sulfonation reactor and the extraction reactor, the extraction reactor and the inert gas supply unit, the extraction reactor and the stripper, the extraction reactor and the pump, and the pump and the stripper are connected through connecting pipes, respectively.

The sulfonation reactor 1, where the sulfonation process of aryl phosphine occurs, includes a reactant inlet (not shown) into which reactants for sulfonation of aryl phosphine are introduced, at the top portion thereof, and includes, at the bottom portion thereof, an outlet which is connected to the top portion of the extraction reactor, and discharges the reaction product containing sulfonated aryl phosphine, which is generated as a result of the sulfonation reaction, into the extraction reactor. In addition, an agitator may be further provided in the sulfonation reactor to increase reaction efficiency through homogeneous mixing of reactants during the sulfonation reaction.

In addition, the extraction reactor 2, where the primary and secondary extraction processes for sulfonated aryl phosphine extraction occur, includes, at the top portion thereof, an inlet through which the reaction product containing sulfonated aryl phosphine is introduced, the reaction product obtained as a result of the sulfonation reaction in the sulfonation reactor; an extractant inlet (not shown) for introducing an extractant; an inert gas outlet for discharging inert gas degassed after streaming of the organic phase during the first extraction process; and an organic phase inlet through which the organic phase is introduced, from which sulfur trioxide has been removed by stripping. In the present invention, both the first extraction using the water-insoluble amine-based extractant and the secondary extraction using the base extractant occur in the extraction reactor. At this time, the primary and secondary extractants may be introduced through the same extractant inlet, or may be separately introduced through respective extractant inlets. On the other hand, the extraction reactor may include, at the bottom portion thereof, an aqueous phase outlet (not shown) which is connected to the sulfonation reactor, and through which the aqueous phase separated after the completion of the first extraction process using the water-insoluble amine-based compound is discharged, and injected into the sulfonation reactor, and recycled; an organic phase outlet for discharging the organic phase to the stripper, after completing the first extraction process; an inert gas inlet through which an inert gas stream is introduced into the extraction reactor during first extraction; a sulfonated aryl phosphine-containing aqueous solution outlet for obtaining the sulfonated aryl phosphine-containing aqueous solution obtained after completing the secondary extraction process. In addition, the extraction reactor 2 may optionally further include an agitator for increasing contact efficiency with the organic phase during streaming of the inert gas thereinside.

In addition, the inert gas supply unit 4 may include an outlet for supplying the inert gas stream into the stripper. In addition, the inert gas supply unit 4 may be directly connected to the stripper, or may be connected to the stripper through the extraction reactor. Specifically, in the device for preparing sulfonated aryl phosphine disclosed in FIG. 1, the inert gas supply unit 4 is connected to the bottom portion of the extraction reactor so that inert gas passes through the extraction reactor and is supplied to the stripper. In addition, in the device 10 for preparing sulfonated aryl phosphine disclosed in FIG. 2, the inert gas supply unit 4' is directly connected to the bottom portion of the stripper 3 so that the inert gas is directly supplied into the stripper 3.

In addition, the stripper 3 is connected to the top and bottom portions of the extraction reactor 2, respectively, and the inert gas inlet, into which the inert gas discharged through the inert gas outlet located at the top portion of the extraction reactor 2 is introduced; and an outlet, through which the organic phase from which sulfur trioxide has been removed is discharged, are located at the bottom portion of the extraction reactor 2. In addition, the organic phase inlet through which the organic phase is introduced, the organic phase discharged from the extraction reactor and introduced into the stripper for removing sulfur trioxide; and the inert gas outlet through which inert gas is discharged, where sulfur trioxide is converted to sulfur dioxide to be absorbed and removed through counter current flow contact with the organic phase, are located at the top portion of the stripper 3.

In addition, a column for current flow contact, such as a tray column or a packing column, is provided inside the stripper 3.

In addition, the stripper 3 may be directly connected to the extraction reactor 2, or may be connected through the pump 5. When the pump 5 is further provided, the inflow of the sulfonated aryl phosphine-containing solution from the extraction reactor 2 to the stripper 3 may be easily controlled.

For example, removal of sulfur trioxide by counter current flow contact using the device for preparing sulfonated aryl having the above configuration will be described.

First, a sulfonation reaction for aryl phosphine is performed in the sulfonation reactor 1, and the resulting reaction product containing sulfonated aryl phosphine is introduced into the extraction reactor through the inlet of the extraction reactor 2. When the water-insoluble amine-based extractant is introduced through a separate extractant inlet, the first extraction process occurs in the extraction reactor 2.

Resulting from the first extraction reaction, the reaction product is separated into an aqueous phase and an organic phase. The aqueous phase is discharged and removed through the aqueous phase outlet, and the organic phase moves to the stripper. Meanwhile, during the first extraction process, an inert gas stream is introduced from the inert gas supply unit 3 through the bottom portion of the extraction reactor, and sulfur trioxide present in the organic phase generated resulting from the first extraction process may be primarily removed.

The organic phase is discharged through the outlet located at the bottom portion of the extraction reactor, and then introduced into the stripper by a pump. In addition, the inert gas stream in the extraction reactor is degassed through the outlet located at the top portion of the extraction reactor and then introduced into the stripper through the inlet at the bottom portion of the stripper.

The organic phase introduced into the top portion of the stripper moves to the bottom portion thereof, and the inert gas introduced into the bottom portion of the stripper moves to the top portion, and thus the current flow contact occurs. In this process, the sulfur trioxide remaining in the organic phase is converted into gaseous sulfur dioxide, which is then absorbed by the inert gas. The sulfur dioxide-absorbed inert gas is discharged and removed through the outlet on the top portion of the stripper. As another method, the sulfur dioxide-absorbed inert gas discharged from the stripper is additionally subjected to a sulfur dioxide removal process, and may be recycled in the process of preparing sulfonated aryl phosphine.

In addition, the organic phase, from which sulfur trioxide is secondarily removed through the current flow contact, is discharged through the outlet at the bottom portion of the stripper, and is reintroduced into the extraction reactor. The base extractant is introduced into the extraction reactor, and secondary extraction of the organic phase is performed. By the secondary extraction process, the amine salt of sulfonated aryl phosphine in the organic phase is converted into an aqueous phase, and thus obtained in an aqueous solution state.

By using the above preparation method and preparation device, it is possible to prepare sulfonated aryl phosphine from which sulfur trioxide is removed, and also to suppress the occurrence of side reactions caused by sulfur trioxide remaining during the reaction using the sulfonated aryl phosphine.

Hereinafter, preferred exemplary embodiments will be provided for better understanding of the present invention. However, the following exemplary embodiments are provided only for illustrating the present invention, but the present invention is not limited thereby.

In the following Experimental Examples, measurement was performed in the following manner.

$SO_3^{2-}$ concentration: measured using an IC (ion chromatography) analysis instrument.

Removal rate, final $SO_2$ concentration (ppm) and Flooding (%): calculated by ASPEN simulation.

EXAMPLE

As disclosed in FIG. 2, sulfonated aryl phosphine was prepared in an aqueous solution phase by a continuous stream process of an extraction solution and inert gas using a device for preparing sulfonated aryl phosphine, in which an inert gas supply unit (4') was directly connected to a stripper.

Specifically, in the sulfonation reactor, 1252 g of a fuming sulfuric acid-containing aqueous solution ($SO_3$ concentration: 25% by weight) was added as a sulfonating agent with respect to 87 g of triphenylphosphine, and reacted at a temperature of 20° C. to perform sulfonation. Thereafter, water was added to perform dilution while maintaining at a temperature of 20° C. until the concentration of sulfuric acid in the reaction product reached 25% by weight to 35% by weight. After moving the diluted reaction product to the extraction reactor, first extraction was performed by introducing 1696 g of a solution in which triisooctylamine as a water-insoluble amine-based extractant was dissolved in toluene at a concentration of 28% by weight. At this time, the extractant was added at a molar ratio of 1.35 based on 1 mole of $SO_3$ in the diluted reaction product. As a result, the reaction product was separated into an organic phase containing an amine salt of sulfonated aryl phosphine and an aqueous phase containing sulfuric acid. The aqueous phase was separated and removed through an aqueous phase outlet in the extraction reactor.

The resulting sulfonated aryl phosphine-containing organic phase was introduced through the inlet at the top portion of the stripper, and nitrogen gas was introduced from the inert gas supply unit through the inlet at the bottom portion of the stripper, thereby performing a process of removing sulfur trioxide through stripping by current flow contact. At this time, the process was performed with the input of nitrogen as the inert gas of 5 L/min, the liquid circulation flow rate of 200 ml/min, 5 theoretical plates, the nitrogen degassing temperature of and the nitrogen degassing time of 30 minutes.

A secondary extraction was performed on the stripped sulfonated aryl phosphine-containing organic phase by adding 20% by weight of an aqueous sodium hydroxide solution and water. At this time, the aqueous sodium hydroxide solution was added so that the pH of the reactant was 6 to 7. As a result, the amine salt of sulfonated aryl phosphine in the organic phase was converted to an aqueous phase by adding the aqueous sodium hydroxide solution, and thus the sulfonated aryl phosphine was finally obtained as a state of being dissolved in the aqueous solution.

Comparative Example 1

Sulfonated phenyl phosphine was prepared in an aqueous solution phase in the same manner as above, except that the sulfur trioxide removal process by counter current flow contact was not performed by removing the stripper from the device for preparing sulfonated aryl phosphine in the above Example. At this time, the nitrogen degassing time in the extraction reactor was set to 30 minutes.

Comparative Example 2

Sulfonated phenyl phosphine was prepared in an aqueous solution phase in the same manner as in Comparative Example 1, except that the nitrogen degassing time was increased to 60 minutes in Comparative Example 1.

Experimental Example 1

During the preparation of sulfonated phenyl phosphine according to Example and Comparative Examples 1 and 2, the effect of reducing the concentration of $SO_3^{2-}$ in the sulfonated phenyl phosphine-containing aqueous solution finally prepared was compared and evaluated. The results are shown in FIG. 3.

As a result of the experiment, in Example 1 in which the sulfur trioxide removal process was performed through current flow contact, the concentration of $SO_3^{2-}$ in the sulfonated phenyl phosphine-containing aqueous solution finally prepared (hereinafter simply referred to as 'aqueous TPPTS solution') was less than 400 ppm, based on the total weight of TPPTS aqueous solution. In contrast, in Comparative Example 1 in which only $N_2$ streams were performed for the same amount of time without the sulfur trioxide removal process through current flow contact, the concentration of $SO_3^{2-}$ in the aqueous TPPTS solution was 1300 ppm or more. In Comparative Example 2 in which the $N_2$ stream time in Comparative Example 1 was increased to 60 minutes, the concentration of $SO_3^{2-}$ in the aqueous TPPTS solution was more than 600 ppm. These experimental results indicate that sulfur trioxide in sulfonated phenyl phosphine may be removed with excellent efficiency when the sulfur trioxide removal process is performed through current flow contact.

Experimental Example 2

In addition, to evaluate the effect of the liquid circulation flow rate on the effect of removing $SO_3$ from sulfonated aryl phosphine, the input of nitrogen as inert gas of 5 L/min, 5 theoretical plates, the nitrogen degassing time of 30 minutes, and the nitrogen degassing temperature of 20° C. were fixed. Then, only the liquid circulation flow rate was changed to 0 ml/min, 100 ml/min, 200 ml/min, 300 ml/min, 400 ml/min, and 500 ml/min, and the content of $SO_3^{2-}$ remaining in the sulfonated phenyl phosphine-containing aqueous solution finally prepared was measured. The results are shown in FIG. 4. In FIG. 4, the concentration (ppm) of $SO_3^{2-}$ is a value based on the weight of the final product, aqueous TPPTS solution.

As a result of the experiment, the concentration of $SO_3^{2-}$ remaining in the sulfonated phenyl phosphine-containing solution rapidly decreased while the circulation flow rate increased up to 200 ml/min. However, after exceeding 200 ml/min, the degree of decrease in the concentration of $SO_3^{2-}$ rather reduced even when the circulation flow rate increased, and the degree of decrease was further reduced from 300 ml/min or more.

Experimental Example 3

In the device for preparing sulfonated aryl phosphine used in the above Example, when a diameter of 0.7 m ID, ASPEN-embedded 1.5 in PLASTIC PALL packing was used, flooding of 45% was designed, the input of nitrogen as inert gas of 1000 NCM/hr, 3 theoretical plates, the nitrogen degassing time of 2 hours, and the nitrogen degassing temperature of 20° C. were fixed, and then only the liquid circulation flow rate was varied, and the concentration of $SO_3^{2-}$ remaining in the aqueous TPPTS solution, the $SO_2$ removal rate, the final $SO_2$ concentration, and flooding (%) were measured and calculated, respectively. The results are shown in Table 1 and FIG. 5 below. At this time, it was assumed that the amount of liquid in the reactor during degassing was 10 m³.

TABLE 1

| | Liquid circulation flow rate (m³/hr) | | | |
| --- | --- | --- | --- | --- |
| | 30 | 36 | 42 | 48 |
| $SO_2$ removal rate | 0.715 | 0.644 | 0.582 | 0.528 |
| Final $SO_2$ concentration (ppm) | 68.7 | 48.4 | 37.7 | 31.4 |
| Flooding (%) | 64.3 | 70.0 | 75.5 | 80.7 |

As a result of the experiment, when the liquid circulation flow rate was increased from 30 m³/hr to 48 m³/hr, while fixing the input of nitrogen of 1000 NCM/hr and 3 theoretical plates, it was possible to reduce the concentration of $SO_2$ in the aqueous TPPTS solution to 50%.

Experimental Example 4

The effect of the input amount of inert gas on the effect of removing $SO_3$ in sulfonated aryl phosphine was evaluated.

The sulfur trioxide removal device the same as in Experimental Example 2 was used, the liquid circulation flow rate of 30 m³/hr, 3 theoretical plates, the nitrogen degassing time of 2 hours, and the nitrogen degassing temperature of 20° C. were fixed, and then only the input of inert gas (N₂) was varied. The SO₂ removal rate, the final SO₂ concentration, and flooding (%) were measured and calculated, respectively. The results are shown in Table 2 and FIG. 6 below.

TABLE 2

|  | N₂ input (NCM/hr) | | | | |
| --- | --- | --- | --- | --- | --- |
|  | 480 | 610 | 740 | 870 | 1000 |
| SO₂ removal rate | 0.427 | 0.519 | 0.596 | 0.661 | 0.715 |
| Final SO₂ concentration (ppm) | 385.2 | 222.5 | 139.7 | 94.7 | 68.7 |
| Flooding (%) | 44.5 | 49.8 | 54.9 | 59.7 | 64.3 |

As a result of the experiment, as the nitrogen input increased, the final SO₂ concentration decreased, and the removal efficiency and flooding increased.

Experimental Example 5

The effect of changes in the theoretical plate of packing in the stripper on the effect of removing sulfur trioxide was evaluated.

In detail, the sulfur trioxide removal device the same as in Experimental Example 2 was used, the nitrogen gas input of 480 NCM/hr, the liquid circulation flow rate of 30 m³/hr, the nitrogen degassing time of 2 hours, and the nitrogen degassing temperature of 20° C. were fixed, and then the theoretical plate was varied. The SO₂ removal rate, the final SO₂ concentration, and flooding (%) were measured and calculated, respectively. The results are shown in Table 3 and FIG. 7 below.

TABLE 3

|  | Plate (number) | | |
| --- | --- | --- | --- |
|  | 5 | 4 | 3 |
| SO₂ removal rate | 0.452 | 0.444 | 0.427 |
| Final SO₂ concentration (ppm) | 332.2 | 349.0 | 385.2 |
| Flooding (%) | — | — | 44.5 |

As a result of the experiment, as the theoretical plate of packing increased, the final SO₂ concentration decreased, indicating that the SO₂ removal efficiency may be increased by 10% or more as high-efficiency packing is used.

Experimental Example 6

In the preparation of sulfonated phenyl phosphine according to the above Example, the maximum liquid circulation flow rate according to each N₂ flow rate, allowing that the final SO₂ concentration was 350 ppm or less and the flooding was 80% or more, was examined. The results are shown in Tables 4 and 5, respectively.

TABLE 4

| N₂ (NCM/hr) | 610 | 740 | 870 | 1000 |
| --- | --- | --- | --- | --- |
| Theoretical plate (number) | 3 | 3 | 3 | 3 |
| Liquid circulation flow rate (m/hr) | 21 | 18 | 15.6 | 15 |

TABLE 4-continued

| SO₂ removal rate | 0.662 | 0.788 | 0.873 | 0.910 |
| --- | --- | --- | --- | --- |
| Final SO₂ concentration (ppm) | 310.5 | 292.9 | 327.9 | 326.3 |
| Flooding (%) | 41.8 | 43.3 | 44.1 | 48.0 |

TABLE 5

| N₂ (NCM/hr) | 610 | 740 | 870 | 1000 |
| --- | --- | --- | --- | --- |
| Theoretical plate (number) | 3 | 3 | 3 | 3 |
| Liquid circulation flow rate (m/hr) | 66 | 60 | 54 | 48 |
| SO₂ removal rate | 0.258 | 0.339 | 0.430 | 0.528 |
| Final SO₂ concentration (ppm) | 164.9 | 85.2 | 48.2 | 31.4 |
| Flooding (%) | 77.2 | 79.2 | 80.3 | 80.7 |

As a result of the experiment, it was confirmed that operation of about 80% flooding is possible even with the nitrogen input of 740 NCM/hr and the liquid circulation flow rate of 60 m³/hr.

| [Reference numerals] | |
| --- | --- |
| 1 Sulfonation reactor | 2 Extraction reactor |
| 3 Stripper | 4, 4' Inert gas supply unit |
| 5 Pump | 10 Device for preparing sulfonated aryl phosphine |

The invention claimed is:

1. A method of preparing sulfonated aryl phosphine, comprising:
performing sulfonation of aryl phosphine to obtain a reaction product comprising sulfonated aryl phosphine;
performing a first extraction by adding a water-insoluble amine-based extractant into the reaction product comprising sulfonated aryl phosphine to obtain an organic phase comprising sulfonated aryl phosphine;
bringing the organic phase into contact with an inert gas by stripping to remove sulfur trioxide in the organic phase; and
performing a secondary extraction by adding a base extractant to the organic phase from which sulfur trioxide has been removed as a result of the above step,
wherein the contact with inert gas is performed by a current flow contact using a stripper,
the stripper comprises a packing column, and
the packing column comprises 3 to 5 theoretical plates.

2. The method of claim 1, wherein the current flow contact is performed by introducing the organic phase into the top portion of the stripper and discharging the organic phase into the bottom portion thereof and by introducing the inert gas into the bottom portion of the stripper and discharging the inert gas into the top portion thereof.

3. The method of claim 1, wherein during the current flow contact, a liquid circulation flow rate is 30 m³/hr to 48 m³/hr, based on the inert gas input of 1000 Nm³/hr.

4. The method of claim 1, wherein the inert gas is nitrogen, helium, argon, neon, xenon, krypton, carbon dioxide, carbon monoxide, or hydrogen.

5. The method of claim 1, wherein the inert gas is introduced in an amount of 480 Nm³/hr to 1000 Nm³/hr, based on 30 m³/hr of a liquid circulation flow rate.

6. The method of claim 1, wherein a process of streaming inert gas is further performed during the first extraction.

7. The method of claim 1, wherein the method is performed by a device for preparing sulfonated aryl phosphine, comprising:

a sulfonation reactor in which sulfonation of aryl phosphine is performed;

an extraction reactor which is placed by being connected with the sulfonation reactor and a stripper, and performs a first extraction of the reaction product comprising sulfonated aryl phosphine introduced from the sulfonation reactor and a secondary extraction of an organic phase from which sulfur trioxide has been removed by stripping in the stripper;

an inert gas supply unit that supplies inert gas into the stripper; and the stripper which is placed by being connected with the extraction reactor and the inert gas supply unit, and performs stripping the organic phase comprising sulfonated aryl phosphine resulting from the first extraction, which is introduced from the extraction reactor, by inert gas introduced from the inert gas supply unit.

8. The method of claim 1, wherein the sulfur trioxide in the organic phase is removed in the form of gaseous sulfur dioxide.

9. The method of claim 1, wherein the aryl phosphine is monophosphine, diphosphine, oligophosphine or polyphosphine, which comprises one or more aromatic radicals.

10. The method of claim 1, wherein the sulfonation is performed by reacting aryl phosphine with fuming sulfuric acid.

11. The method of claim 1, wherein the water-insoluble amine-based extractant comprises isotridecylamine, tri-n-octylamine, triisooctylamine, triisononylamine, tri-n-decylamine, tribenzylamine, or a mixture thereof.

12. The method of claim 1, wherein the base extractant comprises alkali metal hydroxide, alkaline earth metal hydroxide, ammonia, alkali metal carbonate, or a mixture thereof.

* * * * *